(12) United States Patent
Jang et al.

(10) Patent No.: US 11,149,175 B2
(45) Date of Patent: Oct. 19, 2021

(54) PRESSURE SENSITIVE ADHESIVE AND PREPARATION AND USE THEREOF

(71) Applicant: Dow Silicones Corporation, Midland, MI (US)

(72) Inventors: Wonbum Jang, Jincheon-gun (KR); Bo Kyung Bona Kim, Gwangmyeong (KR); Yoonyoung Kim, Gwank-gu (KR)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/635,328

(22) PCT Filed: Jul. 16, 2019

(86) PCT No.: PCT/US2019/041917
§ 371 (c)(1),
(2) Date: Jan. 30, 2020

(87) PCT Pub. No.: WO2022/055505
PCT Pub. Date: Mar. 19, 2020

(65) Prior Publication Data
US 2021/0246342 A1 Aug. 12, 2021

Related U.S. Application Data

(60) Provisional application No. 62/731,113, filed on Sep. 14, 2018.

(51) Int. Cl.
| | | |
|---|---|---|
| *C09J 183/04* | (2006.01) | |
| *B32B 37/12* | (2006.01) | |
| *B32B 5/18* | (2006.01) | |
| *B32B 7/12* | (2006.01) | |
| *B32B 27/36* | (2006.01) | |
| *B32B 27/06* | (2006.01) | |
| *C08L 83/06* | (2006.01) | |
| *C08L 83/04* | (2006.01) | |

(52) U.S. Cl.
CPC .............. *C09J 183/04* (2013.01); *B32B 5/18* (2013.01); *B32B 7/12* (2013.01); *B32B 27/065* (2013.01); *B32B 27/36* (2013.01); *B32B 37/1284* (2013.01); *C08L 83/04* (2013.01); *C08L 83/06* (2013.01); *B32B 2037/1253* (2013.01); *B32B 2266/0278* (2013.01); *B32B 2367/00* (2013.01); *B32B 2375/00* (2013.01); *B32B 2457/202* (2013.01); *B32B 2457/206* (2013.01); *C09J 2483/00* (2013.01)

(58) Field of Classification Search
CPC ...... C09J 183/04; C09J 183/06; C09J 183/08; C09J 183/10; C09J 183/12; C09J 183/14; C09J 183/16; C09J 151/08; C09J 151/085; C08L 2666/02; C08L 2666/28; C08L 2666/44; C08L 83/04; C08L 83/06; C08L 83/08; C08L 83/10; C08L 83/12; C08L 83/14; C08L 2205/02; C08L 2205/025; C08L 2205/03; C08L 2205/035; C08L 2205/05; C08F 283/12; C08F 283/122; C08F 283/124; C08F 283/126; C08F 283/128

See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,611,042 A | 9/1986 | Rivers-Farrell et al. |
| 4,766,176 A | 8/1988 | Lee et al. |
| 4,774,297 A * | 9/1988 | Murakami ............ C09J 183/04 525/478 |
| 4,774,310 A | 9/1988 | Butler |
| 4,784,879 A | 11/1988 | Lee et al. |
| 5,017,654 A | 5/1991 | Togashi et al. |
| 5,175,325 A | 12/1992 | Brown et al. |
| 8,580,073 B2 | 11/2013 | Behl et al. |
| 2006/0189767 A1 | 8/2006 | Bhagwagar et al. |
| 2016/0376482 A1 | 12/2016 | Morgeneyer et al. |

FOREIGN PATENT DOCUMENTS

| | | |
|---|---|---|
| EP | 0347895 B | 12/1989 |
| EP | 867493 | 9/1998 |
| EP | 2913374 | 9/2015 |
| WO | 200200808 | 1/2002 |
| WO | 200711538 | 1/2007 |
| WO | 200783253 | 7/2007 |
| WO | 200881913 | 7/2008 |
| WO | 201131452 | 3/2011 |
| WO | 201386121 | 6/2013 |

\* cited by examiner

*Primary Examiner* — Christopher M Rodd
(74) *Attorney, Agent, or Firm* — Catherine U. Brown (57) ABSTRACT

A silicone pressure sensitive adhesive composition includes an alkenyl-terminated polydiorganosiloxane, a polyorganosilicate resin, a polyorganohydrogensiloxane crosslinker, a hydrosilylation reaction catalyst, a hydrosilylation reaction inhibitor, and a solvent. The composition cures to form a pressure sensitive adhesive with selective adhesion to different substrates, including urethane foam. The pressure sensitive adhesive composition, pressure sensitive adhesive, and urethane foam article including the pressure sensitive adhesive are useful in electronics applications for the protection of display devices.

19 Claims, 1 Drawing Sheet

PRESSURE SENSITIVE ADHESIVE AND PREPARATION AND USE THEREOF

CROSS REFERENCE TO RELATED APPLICATIONS

This application is a U.S. national stage filing under 35 U.S.C. § 371 of PCT Application No. PCT/US2019/041917 filed on Jul. 16, 2019, which claims the benefit of U.S. Provisional Patent Application No. 62/731,113 filed Sep. 14, 2018 under 35 U.S.C. § 119 (e). PCT Application No. PCT/US2019/041917 and U.S. Provisional Patent Application No. 62/731,113 are hereby incorporated by reference.

TECHNICAL FIELD

A pressure sensitive adhesive composition is curable via hydrosilylation reaction. The pressure sensitive adhesive prepared by curing the composition has selective adhesion to different substrates. The pressure sensitive adhesive composition, and the pressure sensitive adhesive prepared by curing same, are useful in electronics applications for use in carrier tapes providing protection during fabrication of display devices.

BACKGROUND

In the process of manufacturing and use of display devices, such as OLED devices and LCD devices, the display device should be protected from shocks, e.g., dropping on the ground. Urethane foam is a shock absorber for display devices. However, urethane foam is soft and thin, and cannot be handled independently. A carrier tape is desired for transferring the urethane foam to a display device.

SUMMARY

A pressure sensitive adhesive composition comprises:
(A) 100 to 70 parts by weight of a bis-alkenyl-terminated polydiorganosiloxane comprising unit formula $$(R^1R^2{}_2SiO_{1/2})_a(R^2{}_2SiO_{2/2})_b,$$

where each $R^1$ is an independently selected alkenyl group of 2 to 6 carbon atoms, each $R^2$ is an independently selected monovalent hydrocarbyl group free of aliphatic unsaturation, subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and a total alkenyl content>0 to <0.1%, based on weight of the bis-alkenyl-terminated polydiorganosiloxane;
(B) 1 to 30 parts by weight of a polyorganosilicate resin comprising units of formulae $$(R^3{}_3SiO_{1/2})_e(SiO_{4/2})_f,$$

where each $R^3$ is an independently selected monovalent hydrocarbyl group having 1 to 10 carbon atoms, and subscripts e and f have values such that a molar ratio (e/f)<0.9 and a quantity (e+f) has a value sufficient to give the resin a weight average molecular weight of 8,000 Da to 25,000 Da, and the polyorganosilicate resin further comprises a silanol content>1% based on weight of the polyorganosilicate resin;
(C) 0.01 to 5 parts by weight of a polyorganohydrogensiloxane comprising unit formula $$(HR^4{}_2SiO_{1/2})_g(R^4{}_3SiO_{1/2})_h(R^4{}_2SiO_{2/2})_i(HR^4SiO_{2/2})_j,$$

where each $R^4$ is an independently selected alkyl group of 1 to 10 carbon atoms, and subscripts g, h, i, and j have values such that g≥0, h≥0, a quantity (g+h) has an average value of 2, i≥0, j>0, and a quantity (g+j)>0 and the quantity (g+j) has a value sufficient to provide the polyorganohydrogensiloxane with at least 1% silicon bonded hydrogen atoms;
(D) a hydrosilylation reaction catalyst in an amount sufficient to provide 10 to 5,000 ppm by weight of a platinum group metal to the composition;
(E) >0.05 to 5.0 parts by weight, per 100 parts by weight based on combined weights of all starting materials in the composition, of a hydrosilylation reaction inhibitor; and
(F) 10% to 90% by weight of an organic solvent, based on combined weights of all starting materials in the composition;
where all of the starting materials are selected such that silicon bonded hydrogen content to aliphatically unsaturated group content molar ratio is 0.7 to 20 in the composition.

REFERENCE NUMERALS 101 carrier tape
102 OLED device
103 urethane foam substrate
104 device facing surface
105 opposing surface
106 surface
107 plastic film
108 pressure sensitive adhesive
109 carrier tape
110 backside
111 OLED device
112 second plastic film
113 double sided tape

DETAILED DESCRIPTION

A pressure sensitive adhesive composition comprises:
(A) 100 to 70 parts by weight of a bis-alkenyl-terminated polydiorganosiloxane comprising unit formula $$(R^1R^2{}_2SiO_{1/2})_a(R^2{}_2SiO_{2/2})_b,$$

where each $R^1$ is an independently selected alkenyl group of 2 to 6 carbon atoms, each $R^2$ is an independently selected monovalent hydrocarbyl group free of aliphatic unsaturation, subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and a total alkenyl content greater than 0 to less than 0.1%, based on the weight of the bis-alkenyl-terminated polydiorganosiloxane;
(B) 1 to 30 parts by weight of a polyorganosilicate resin comprising unit formula $$(R^3{}_3SiO_{1/2})_e(SiO_{4/2})_f,$$

where each $R^3$ is an independently selected monovalent hydrocarbyl group having 1 to 10 carbon atoms, and subscripts e and f have values such that a molar ratio (e/f)<0.9 and a quantity (e+f) has a value sufficient to give the resin a weight average molecular weight of 8,000 Da to 25,000 Da;

(C) 0.01 to 5 parts by weight of a polyorganohydrogensiloxane comprising unit formula $(HR^4{}_2SiO_{1/2})_g(R^4{}_3SiO_{1/2})_h(R^4{}_2SiO_{2/2})_i(HR^4SiO_{2/2})_j$, where each $R^4$ is an independently selected alkyl group of 1 to 10 carbon atoms, and subscripts g, h, i, and j have values such that g≥0, h≥0, a quantity (g+h) has an average value of 2, i≥0, j>0, and a quantity (g+j)>0 and the quantity (g+j) has a value sufficient to provide the polyorganohydrogensiloxane with at least 1% silicon bonded hydrogen atoms;

(D) a hydrosilylation reaction catalyst in an amount sufficient to provide 10 to 5,000 ppm of a platinum group metal to the composition;

(E) >0.05 to 5.0 parts by weight, per 100 parts by weight based on combined weights of all starting materials in the composition, of a hydrosilylation reaction inhibitor; and (F) 10% to 90% by weight of an organic solvent, based on combined weights of all starting materials in the composition;

where all of the starting materials are selected such that overall SiH/Vi molar ratio is 0.7 to 20 in the composition.

Starting Material (A) Bis-Alkenyl-Terminated Polydiorganosiloxane

Starting material (A) in the pressure sensitive adhesive composition comprises a bis-alkenyl-terminated polydiorganosiloxane comprising unit formula (A-1):

$(R^1R^2{}_2SiO_{1/2})_a(R^2{}_2SiO_{2/2})_b$, where each $R^1$ is an independently selected alkenyl group of 2 to 6 carbon atoms, each $R^2$ is an independently selected monovalent hydrocarbyl group free of aliphatic unsaturation, subscript a has an average value of 2, and subscript b is 1 or more, quantity (a+b) has a value sufficient to provide the bis-alkenyl-terminated polydiorganosiloxane with a weight average molecular weight of 100,000 to 1,000,000; and subscript a has a value such that total alkenyl content of the bis-alkenyl-terminated polydiorganosiloxane is >0 to <0.1% based on the weight of the bis-alkenyl-terminated polydiorganosiloxane.

In unit formula A-1), each $R^1$ is an independently selected alkenyl group of 2 to 6 carbon atoms. Alternatively, each $R^1$ may be vinyl, allyl, or hexenyl. Alternatively, each $R^1$ may be vinyl. Total alkenyl content of the bis-alkenyl-terminated polydiorganosiloxane is greater than 0 to less than 0.1% based on the weight of the bis-alkenyl-terminated polydiorganosiloxane.

In unit formula A-1), each $R^2$ is an independently selected monovalent hydrocarbyl group free of aliphatic unsaturation. Alternatively, each $R^2$ may be alkyl or aryl. Alternatively, each $R^2$ may be methyl or phenyl. Alternatively, each $R^2$ may be methyl.

In unit formula A-1), subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and the alkenyl content of >0% to <1% based on the weight of the bis-alkenyl-terminated polydiorganosiloxane. Alternatively, the bis-alkenyl-terminated polydiorganosiloxane may have a Mw of 500,000 to 1,000,000; alternatively >500,000 to 1,000,000; alternatively >500,000 to 900,000, and alternatively 600,000 to 800,000; and alternatively 700,000. Alternatively, subscript b may be 4,000 to 6,000; and alternatively, subscript b may be 4,500 to 5,500. Starting material A-1) is exemplified by: A-1-1) bis-dimethylvinylsiloxy-terminated polydimethylsiloxane, A-1-2) bis-phenyl,methyl,vinyl-siloxy-terminated polydimethylsiloxane, A-1-3) bis-dimethylhexenylsiloxy-terminated polydimethylsiloxane, A-1-4) bis-dimethylvinylsiloxy-terminated poly(dimethylsiloxane/methylphenylsiloxane), A-1-5) bis-dimethylvinylsiloxy-terminated poly(dimethylsiloxane/diphenylsiloxane), or A-1-6) a combination of two or more of A-1-1), A-1-2), A-1-3), A-1-4), and A-1-5). Starting material A-1) may be present in an amount of 50% to 100%, alternatively 50% to 99%, based on total weight of starting material (A).

Starting material (A) may optionally further comprise a bis-alkenyl-terminated polydiorganosiloxane having one or more pendant alkenyl groups comprising unit formula A-2):

$(R^1R^2{}_2SiO_{1/2})_a(R^2{}_2SiO_{2/2})_b(R^1R^2SiO_{2/2})_c$, where $R^1$, $R^2$ and subscripts a and b are as described above, subscript c is 1 or more, and a quantity (a+b+c) has a value sufficient to provide the bis-alkenyl-terminated polydiorganosiloxane with a weight average molecular weight of 100,000 to 1,000,000; and a quantity (a+c) has a value such that total alkenyl content of the bis-alkenyl-terminated polydiorganosiloxane of unit formula A-2) is >0 to <0.1% based on weight of the bis-alkenyl-terminated polydiorganosiloxane of unit formula A-2). Alternatively, in formula A-2) subscript b may be 4,000 to 6,000; and alternatively, subscript b may be 4,500 to 5,500. Alternatively, subscript c may be 0 to 50; and alternatively, subscript c may be 5 to 30. Alternatively, the bis-alkenyl-terminated polydiorganosiloxane of formula A-2) may have a Mw of 500,000 to 1,000,000; alternatively >500,000 to 1,000,000; alternatively >500,000 to 900,000, and alternatively 600,000 to 800,000; and alternatively 700,000. Starting material A-2) may be present in an amount of 0 to 50%, alternatively 1% to 50%, based on total weight of starting material (A).

Starting material A-2) is exemplified by: A-2-1) bis-dimethylvinylsiloxy-terminated poly(dimethylsiloxane/methylvinylsiloxane). Alternatively, starting material (A) may be A-1-1) or a combination of A-1-1) and A-2-1).

Methods of preparing polydiorganosiloxanes suitable for use as starting material (A), such as hydrolysis and condensation of the corresponding organohalosilanes or equilibration of cyclic polydiorganosiloxanes, are well known in the art.

The amount of starting material (A) in the pressure sensitive adhesive composition is 100 to 70 parts by weight, based on combined weights of all starting materials in the composition. Alternatively, the amount of starting material (A) may be 100 to 80 parts by weight, alternatively 90 to 80 parts by weight, alternatively 90 to 70 parts by weight, and alternatively 100 to 90 parts by weight, on the same basis.

Starting Material (B) Polyorganosilicate Resin

The polyorganosilicate resin useful as starting material (B) comprises unit formula B-1):

$(R^3{}_3SiO_{1/2})_e(SiO_{4/2})_f$,

In unit formula B-1), each $R^3$ is an independently selected monovalent hydrocarbon group having 1 to 10 carbon atoms. Alternatively, each $R^3$ may be selected from the group consisting of alkyl, alkenyl and aryl. Alternatively, each $R^3$ may be selected from methyl, vinyl and phenyl. Alternatively, at least one-third, alternatively at least two thirds of the $R^3$ groups are methyl groups. Alternatively, each $R^3$ may be methyl.

In unit formula B-1), subscripts e and f have values such that a molar ratio (e/f)<0.9, alternatively 0.5<(e/f)<0.9. A quantity (e+f) has a value sufficient to give the polyorganosilicate resin a Mw of 8,000 Da to 25,000 Da, alternatively 11,000 Da to 25,000 Da, alternatively 18,000 Da to 25,000 Da. Alternatively, subscript e may have a value such that 50<e<200. Alternatively, subscript f may have a value such that 50<f<200. The polyorganosilicate resin is soluble in solvents such as those described herein as starting material (F), exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises units in the formula described above, and the polyorganosilicate resin further comprises units with silicon bonded hydroxyl (silanol) groups and may comprise neopentamer of formula $Si(OSiR^3_3)_4$, where $R^3$ is as described above, e.g., the neopentamer may be tetrakis(trimethylsiloxy)silane when each $R^3$ is methyl. $^{29}$Si NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion.

The Mw of the polyorganosilicate resin described above depends on various factors including the types of hydrocarbon groups represented by $R^3$ that are present. The Mw of the polyorganosilicate resin refers to the weight average molecular weight measured using GPC, when the peak representing the neopentamer is excluded from the measurement. A suitable GPC technique is described in the reference examples herein.

U.S. Pat. No. 8,580,073 at col. 3, line 5 to col. 4, line 31, and U.S. Patent Publication 2016/0376482 at paragraphs [0023] to [0026] are hereby incorporated by reference for disclosing polyorganosilicate (e.g., MQ) resins, which are suitable polyorganosilicate resins for use in the pressure sensitive adhesive composition described herein. The polyorganosilicate resin can be prepared by any suitable method, such as cohydrolysis of the corresponding silanes or by silica hydrosol reaction methods. The polyorganosilicate resin may be prepared by silica hydrosol reaction processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. Alternatively, the polyorganosilicate resin may be uncapped. The resulting polyorganosilicate resins generally contain from 2% to 5% of hydroxyl groups (silanol content).

The intermediates used to prepare the polyorganosilicate resin may be triorganosilanes and silanes with four hydrolyzable substituents or alkali metal silicates. The triorganosilanes may have formula $R^3_3SiX^1$, where $R^3$ is as described above and $X^1$ represents a hydrolyzable substituent, such as halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically further comprises silicon bonded hydroxyl groups, i.e., of formulae, $HOSi_{3/2}$ and/or $HOR^3_2SiO_{1/2}$.

The polyorganosilicate resin may comprise >1% to 5% of silicon bonded hydroxyl groups (silanol content), as measured by $^{29}$Si NMR, and a suitable technique is described in the reference examples herein. The polyorganosilicate resin used in the pressure sensitive adhesive composition may contain a silanol content >1%, alternatively >2%, alternatively >2.5%, alternatively >1% to 5%, alternatively 2% to 5%, alternatively >2% to 5%, alternatively 2.5% to 5%, and alternatively >2.5% to 5%.

The amount of polyorganosilicate resin is 1 to 30 parts by weight based on combined weights of all starting materials in the composition. Alternatively, the amount of resin may be 1 to 20, alternatively 5 to 30, alternatively 1 to 25, alternatively 5 to 25, and alternatively 5 to 20, parts by weight on the same basis.

Starting Material (C) Crosslinker

Starting material (C) is 0.01 to 5 parts by weight a polyorganohydrogensiloxane. Starting material (C) may act as a crosslinker in the pressure sensitive adhesive composition.

Starting material (C) may have at least 2, alternatively least 3, silicon bonded hydrogen atoms per molecule. Starting material (C) comprises unit formula C-1):

$(HR^4_2SiO_{1/2})_g(R^4_3SiO_{1/2})_h(R^4_2SiO_{2/2})_i(HR^4SiO_{2/2})_j$.

In unit formula C-1), each $R^4$ is an independently selected alkyl group of 1 to 10 carbon atoms. Alternatively, each $R^4$ may be selected from the group consisting of alkyl and aryl. Alternatively, each $R^4$ may be selected from methyl and phenyl. Alternatively, each $R^4$ may be methyl.

In unit formula C-1), subscripts g, h, i, and j have values such that g≥0, h≥0, a quantity (g+h) has an average value of 2, i≥0, j>0, and a quantity (g+j)>0 and the quantity (g+j) has a value sufficient to provide the polyorganohydrogensiloxane with at least 1% silicon bonded hydrogen atoms. Alternatively, subscript g may be 0. Alternatively, subscript h may be 2. Alternatively, a quantity (i+j) may be 30 to 500. Alternatively, subscript i may be 0. Alternatively, subscript j may be 2 to 500, alternatively 2<j<500, and alternatively subscript j may be 30 to 300.

Alternatively, subscript g may be 0, subscript i may be 0, and subscript h may be 2, and starting material (C) may have unit formula C-2):

$(R^4_3SiO_{1/2})_2(HR^4SiO_{2/2})_j$, where $R^4$ is as described above. In unit formula C-2), subscript j may be 30 to 300.

Polyorganohydrogensiloxanes for starting material (C) are exemplified by:
C-3) dimethylhydrogensiloxy-terminated polydimethylsiloxane,
C-4) dimethylhydrogensiloxy-terminated poly(dimethylsiloxane/methylhydrogensiloxane),
C-5) dimethylhydrogensiloxy-terminated polymethylhydrogensiloxane,
C-6) trimethylsiloxy-terminated poly(dimethylsiloxane/methylhydrogensiloxane), C-7) trimethylsiloxy-terminated polymethylhydrogensiloxane, and C-8) a combination of two or more of C-1), C-2), C-3), C-4), C-5), C-6) and C-7). Alternatively, starting material (C) may be selected from the group consisting of C-6), C-7) or a combination of both C-6) and C-7).

Methods of preparing organohydrogenpolysiloxanes, such as hydrolysis and condensation of organohalosilanes, are well known in the art.

The amount of starting material (C) depends on various factors including the concentration of aliphatically unsaturated monovalent hydrocarbon groups (e.g., alkenyl) in all the starting materials of the pressure sensitive adhesive composition and the silicon bonded hydrogen (SiH) content of all starting materials (i.e., starting material (C) and any other starting materials that contain SiH). However, the amount of starting material (C) may be 0.01 to 5 weight parts, per 100 weight parts based on combined weights of all starting materials in the pressure sensitive adhesive composition. Alternatively, the amount of starting material (C) may be 0.1 to 5 weight parts, alternatively 0.02 to 5 weight parts, alternatively 0.02 to 1 weight part, alternatively 0.03 to 5 weight parts, alternatively 0.03 to 1 weight part, alternatively 0.05 to 5 weight parts, and alternatively 0.05 to 1 weight part, on the same basis.

Starting Material (D) Hydrosilylation Reaction Catalyst

Starting material (D) is a hydrosilylation reaction catalyst. Hydrosilylation reaction catalysts are known in the art and are commercially available. Hydrosilylation reaction catalysts include platinum group metal catalysts. The hydrosilylation reaction catalyst can be a metal selected from platinum, rhodium, ruthenium, palladium, osmium, and iridium; alternatively platinum. Alternatively, the hydrosilylation reaction catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphosphino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation reaction catalyst may comprise 1,3-diethenyl-1,1,3,3-tetramethyldisiloxane complex with platinum. Alternatively, the hydrosilylation reaction catalyst may comprise a platinum complex dissolved in a bis-dimethylvinylsiloxy-terminated polydimethylsiloxane. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654.

The amount of catalyst used herein will depend on various factors including the selection of starting materials (A), (B), and (C) and their respective contents of silicon bonded hydrogen atoms and aliphatically unsaturated groups, and the type and amount of inhibitor that is present, however, the amount of catalyst is sufficient to catalyze hydrosilylation reaction of SiH and aliphatically unsaturated groups, alternatively the amount of catalyst is sufficient to provide 10 ppm to 10,000 ppm of the platinum group metal, alternatively 1,000 ppm to 9,000 ppm, alternatively 2,000 ppm to 8,000 ppm, alternatively 3,000 ppm to 7,000 ppm, alternatively 4,000 ppm to 6,000 ppm and alternatively 5,000 ppm; based on combined weights of all starting materials in the pressure sensitive adhesive composition.

Starting Material (E) Inhibitor

The pressure sensitive adhesive composition further comprises starting material (E) a hydrosilylation reaction inhibitor. Inhibitors for hydrosilylation reactions are exemplified by E-1) an acetylenic alcohol, E-2) a silylated acetylenic compound, and E-3) a combination of both E-1) and E-2).

Suitable acetylenic alcohols for starting material E-1) are exemplified by methyl butynol such as 3-methyl-1-butyn-3-ol, ethynyl cyclohexanol such as 1-ethynyl-1-cyclohexanol, dimethyl hexynol such as 3,5-dimethyl-1-hexyn-3-ol, 1-butyn-3-ol, 1-propyn-3-ol, 2-methyl-3-butyn-2-ol, 3-methyl-1-pentyn-3-ol, 3-phenyl-1-butyn-3-ol, 4-ethyl-1-octyn-3-ol, 3,5-dimethyl-1-hexyn-3-ol, and a combination of two or more thereof. Alternatively, starting material E-1) may comprise ethynyl cyclohexanol. Suitable acetylenic alcohols are commercially available, e.g., from Sigma Aldrich.

The silylated acetylenic compound for starting material E-2) is exemplified by (3-methyl-1-butyn-3-oxy)trimethylsilane, [(1,1-dimethyl-2-propynyl)oxy]trimethylsilane, bis (3-methyl-1-butyn-3-oxy)dimethylsilane, bis(3-methyl-1-butyn-3-oxy)silanemethylvinylsilane, bis[(1,1-dimethyl-2-propynyl)oxy]dimethylsilane, methyl[tris(1,1-dimethyl-2-propynyloxy)]silane, methyl[tris(3-methyl-1-butyn-3-oxy)]silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, starting material E-2) is exemplified by methyl[tris(1,1-dimethyl-2-propynyloxy)]silane, [(1,1-dimethyl-2-propynyl)oxy]trimethylsilane, or a combination thereof. Alternatively, starting material E-2) may comprise methyl[tris(1,1-dimethyl-2-propynyloxy)]silane. The silylated acetylenic compound useful an inhibitor may be prepared by methods known in the art, such as silylating an acetylenic alcohol described above by reacting it with a chlorosilane in the presence of an acid receptor.

Alternatively, E-3) the combination of E-1) and E-2) may be used as the inhibitor. For example, the inhibitor may comprise ethynyl cyclohexanol such as 1-ethynyl-1-cyclohexanol, and [(1,1-dimethyl-2-propynyl)oxy]trimethylsilane.

The amount of inhibitor will depend on various factors including the desired pot life of the pressure sensitive adhesive composition, the temperature selected for curing the pressure sensitive adhesive composition, the particular inhibitor used, and the selection and amounts other starting materials used. However, when present, the amount of inhibitor may be >0.05 to 5 parts by weight, alternatively 0.1 to 5 parts by weight, per 100 parts by weight, based on combined weights of all starting materials in the pressure sensitive adhesive composition.

Starting Material (F) Solvent

Starting material (F) is a solvent. The solvent may facilitate flow of the pressure sensitive adhesive composition and introduction of certain starting materials, such as the polyorganosilicate resin. Solvents used herein are those that help fluidize the starting materials but essentially do not react with them. The solvent may be selected based on solubility the starting materials and volatility. The solubility refers to the solvent being sufficient to dissolve and/or disperse the starting materials. Volatility refers to vapor pressure of the solvent. If the solvent is too volatile (having too high vapor pressure) bubbles may form in the pressure sensitive adhesive composition during hydrosilylation reaction, and the bubbles may cause cracks or otherwise weaken or detrimentally affect properties of the pressure sensitive adhesive. However, if the solvent is not volatile enough (too low vapor pressure) the solvent may remain as a plasticizer in the pressure sensitive adhesive prepared by curing the pressure sensitive adhesive composition.

Suitable solvents include polyorganosiloxanes with suitable vapor pressures, such as hexamethyldisiloxane, octamethyltrisiloxane, hexamethylcyclotrisiloxane and other low molecular weight polyorganosiloxanes, such as 0.5 to 1.5 cSt DOWSIL® 200 Fluids and DOWSIL® OS FLUIDS, which are commercially available from Dow Silicones Corporation of Midland, Mich., U.S.A.

Alternatively, the solvent may comprise an organic solvent. The organic solvent can be an aromatic hydrocarbon such as benzene, toluene, or xylene; an aliphatic hydrocarbon such as heptane, hexane, or octane; a halogenated hydrocarbon such as dichloromethane, 1,1,1-trichloroethane or methylene chloride; chloroform; dimethyl sulfoxide; dimethyl formamide; tetrahydrofuran; white spirits; mineral spirits; naphtha; n-methyl pyrrolidone; or a combination thereof. Alternatively, starting material (F) may comprise an aromatic hydrocarbon, such as toluene. Suitable organic solvents are known in the art and are commercially available from, e.g., Fisher Scientific. The amount of solvent depends on various factors including the selection of solvent, its vapor pressure, and the solubility of the other starting materials therein, however the amount of solvent may be 10% to 90% based on combined weights of all starting materials in the composition. Alternatively, amount of solvent may be 20% to 80%, and alternatively 30% to 70%, on the same basis.

The starting materials and amounts selected provide the pressure sensitive adhesive composition with a silicon bonded hydrogen content to aliphatically unsaturated group content molar ratio (overall SiH/Vi ratio) of 0.7 to 20. Alternatively, overall SiH/Vi ratio may be 1 to 20, alternatively >1 to 20, alternatively 1 to 15, alternatively >1 to 15, alternatively 1 to 10, alternatively >1 to 10, and alternatively 5 to 15.

The pressure sensitive adhesive described herein may be free of materials that contain hydrolyzable groups capable of reacting with the silanol groups on the polyorganosilicate resin under the conditions for preparation and use of the pressure sensitive adhesive composition, such as conventional adhesion promoters and anchorage additives, which have silicon bonded hydrolyzable groups and which are frequently added to pressure sensitive adhesive compositions to improve adherence of the pressure sensitive adhesive to one or more substrates. Without wishing to be bound by theory, it is thought that any the hydrolyzable groups on the adhesion promoter would react with the silanol of the polyorganosilicate resin and derivatize the resin, instead of acting to adhere the pressure sensitive adhesive to a substrate. For example, silanes, partial condensates thereof, and oligosiloxanes with hydrolyzable groups, e.g., hydrocarbonoxy such as alkoxy, acyl such as acetyl, oxime, and ketoxime are not intentionally added to the pressure sensitive adhesive composition described herein and are not present or are present at levels insufficient to react with the polyorganosilicate resin. For the same reasons, the pressure sensitive adhesive composition may be free of water and/or may be free of treated and untreated fillers and other particulates that may have hydrolyzable groups on their surfaces.

Method of Making the Pressure Sensitive Adhesive Composition

The pressure sensitive adhesive composition can be prepared by a method comprising combining all starting materials by any convenient means such as mixing at ambient or elevated temperature. The inhibitor may be added before the hydrosilylation reaction catalyst, for example, when the pressure sensitive adhesive composition will be prepared at elevated temperature and/or the pressure sensitive adhesive composition will be prepared as a one part composition.

The method may further comprise delivering one or more starting materials in a solvent (e.g., the polyorganosilicate resin and/or the hydrosilylation reaction catalyst) may be dissolved in a solvent when combined with one or more of the other starting materials in the composition.

Alternatively, the pressure sensitive adhesive composition may be prepared as a multiple part composition, for example, when the pressure sensitive adhesive composition will be stored for a long period of time before use, e.g., up to 6 hours before coating the pressure sensitive adhesive composition on a substrate. In the multiple part composition, the hydrosilylation reaction catalyst is stored in a separate part from any starting material having a silicon bonded hydrogen atom, for example, the polyorganohydrogensiloxane, and the parts are combined shortly before use of the pressure sensitive adhesive composition.

For example, a multiple part composition may be prepared by combining starting materials comprising at least some of (A) the bis-alkenyl-terminated polydiorganosiloxane, (C) the polyorganohydrogensiloxane, and optionally one or more other additional starting materials described above to form a base part, by any convenient means such as mixing. A curing agent may be prepared by combining starting materials comprising at least some of (A) the bis-alkenyl-terminated polydiorganosiloxane, (D) the hydrosilylation reaction catalyst, and optionally one or more other additional starting materials described above by any convenient means such as mixing. The starting materials may be combined at ambient or elevated temperature. Starting material (E) the hydrosilylation reaction inhibitor may be included in one or more of the base part, the curing agent part, or a separate additional part. Starting material (B) the polyorganosilicate resin, and starting material (F) the solvent, may each be independently added to the base part, the curing agent part, or a separate additional part. Alternatively, one or more starting materials may be added in a separate additional part. When a two part composition is prepared, the weight ratio of amounts of base part to curing agent part may range from 1:1 to 10:1. The pressure sensitive adhesive composition will cure via hydrosilylation reaction to form a pressure sensitive adhesive.

The method described above may further comprise one or more additional steps. The pressure sensitive adhesive composition prepared as described above may be used to form an adhesive article, e.g., a pressure sensitive adhesive (prepared by curing the pressure sensitive adhesive composition described above) on a substrate. The method may, therefore, further comprise comprises applying the pressure sensitive adhesive composition to a substrate.

Applying the pressure sensitive adhesive composition to the substrate can be performed by any convenient means. For example, the pressure sensitive adhesive curable composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 120° C., alternatively 150° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polyethylene (PE), or polypropylene (PP). The substrate may be a urethane foam. Alternatively, the pressure sensitive adhesive composition may be interposed between two substrates, e.g., between a urethane foam and a plastic film, such as PET. The thickness of the substrate is not critical, however, the thickness may be 5 micrometers to 300 micrometers.

To improve bonding of the pressure sensitive adhesive to the substrate, the method for forming the adhesive article may optionally further comprise treating the substrate before applying the pressure sensitive adhesive composition. Treating the substrate may be performed by any convenient means, such as applying a primer, or subjecting the substrate to corona-discharge treatment, etching, or plasma treatment before applying the pressure sensitive adhesive composition to the substrate.

An adhesive article such as a film or tape may be prepared by applying the pressure sensitive adhesive composition described above onto the substrate described above. For example, the pressure sensitive adhesive composition may be coated on one of the substrates, such as PET. The method may further comprise removing the all, or a portion, of the solvent before and/or during curing. Removing solvent may be performed by any convenient means, such as heating at a temperature that vaporizes the solvent without fully curing the pressure sensitive adhesive composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes). A second substrate, such as urethane foam, may be contacted with the pressure sensitive adhesive composition before curing, or with the pressure sensitive adhesive after curing.

Curing the pressure sensitive adhesive composition may be performed by heating at a temperature of 80° C. to 200° C., alternatively 90° C. to 180° C., alternatively 100° C. to 160° C., and alternatively 110° C. to 150° C. for a time sufficient to cure the pressure sensitive adhesive composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the pressure sensitive adhesive composition to be applied to the substrate depends on the specific application, however, the amount may be sufficient such that after curing thickness of the pressure sensitive adhesive may be 5 um to 100 um, and for protective film the thickness may be 6 um to 50 um, alternatively 8 um to 40 um, alternatively 10 um to 30 um, alternatively 9 um to 15 um, and alternatively 9 um to 11 um.

The pressure sensitive adhesive composition and pressure sensitive adhesive prepared by curing the composition to form an adhesive article (e.g., carrier tape) prepared as described herein is suitable for use in electronic device processing. For example, in one embodiment, the adhesive article may be used in display device fabrication methods, such as an OLED device fabrication method, or an LCD device fabrication method, for protection from shocks.

Figure 1:
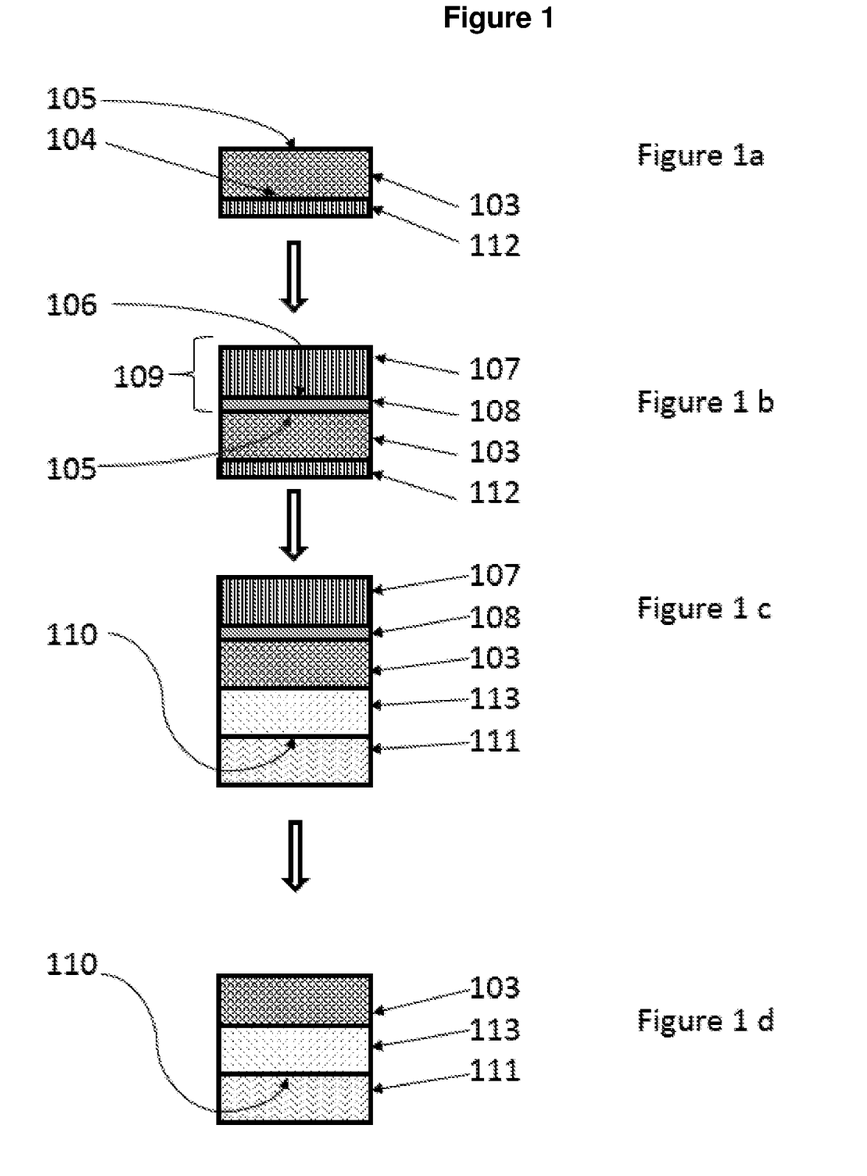
FIG. 1 is a diagram showing a method of fabricating an OLED device using the pressure sensitive adhesive composition described herein.

FIG. 1 shows a method for fabrication of a carrier tape 109 and use thereof in protection of an OLED device 111. The method comprises:

in FIG. 1a, 1) providing a urethane foam substrate 103 having a device facing surface 104 and an opposing surface 105 opposite the device facing surface 104, in FIG. 1b, 2) interposing the pressure sensitive adhesive composition described herein between a surface 106 of a plastic film 107 and the opposing surface 105 of the urethane foam substrate 103, and 3) curing the pressure sensitive adhesive composition to form a pressure sensitive adhesive 108, thereby forming a carrier tape 109 on the opposing surface 105 of the urethane foam substrate 103. FIG. 1c shows that the method may further comprise: 4) adhering the device facing surface 104 of the urethane foam substrate 103 to a backside 110 of a mobile display device, shown in the figure as an OLED device 111. FIG. 1d shows that the method may further comprise: 5) removing the carrier tape 109 from the opposing surface 105 of the urethane foam substrate 103.

In step 1) of this method, the device facing surface 104 of the urethane foam substrate 103 may be mounted to a second plastic film 112, and the second plastic film may be removed before step 4). The device facing surface 104 of the urethane foam substrate 103 is adhered to the backside 110 of the OLED device 111 through a double sided tape 113 interposed between the backside 110 of the OLED device 111 and the device facing surface 104 of the urethane foam substrate 103.

EXAMPLES

These examples are intended to illustrate some embodiments of the invention and should not be interpreted as limiting the scope of the invention set forth in the claims. The starting materials in Table 1 were used in the examples herein.

TABLE 1

| Starting Material | Description |
|---|---|
| a-1) gum | bis-dimethylvinylsiloxy terminated polydimethylsiloxane with DP of 5,836 and Mw = 700,000 |
| a-2) gum | bis-dimethylvinylsiloxy-terminated poly(dimethylsiloxane/methylvinylsiloxane) of unit formula $M^{Vi}_2 D_{5141} D^{Vi}_7$ where |

TABLE 1-continued

| Starting Material | Description |
|---|---|
| a-3) gum | $M^{Vi}$ has formula $(ViMe_2SiO_{1/2})$, D has formula $(Me_2SiO_{2/2})$ and $D^{Vi}$ has formula $(ViMeSiO_{2/2})$ and Mw = 700,000 bis-dimethylvinyl-siloxy terminated poly(dimethylsiloxane/methylvinylsiloxane) of unit formula $M^{Vi}_2D_{4829}D^{Vi}_{25}$ where $M^{Vi}$ has formula $(ViMe_2SiO_{1/2})$, D has formula $(Me_2SiO_{2/2})$ and $D^{Vi}$ has formula $(ViMeSiO_{2/2})$ and Mw = 700,000 |
| b-1) MQ resin | polymethylsilicate resin with Mw = 18,000, silanol content = 2.7% and M/Q molar ratio = 0.89 |
| b-2) MQ resin | polymethylsilicate resin with Mw = 16,000, silanol content = 1.0% and M/Q molar ratio = 1 |
| b-3) MQ resin | polymethylsilicate resin with Mw = 4,500, silanol content = 2.86% and M/Q molar ratio = 0.89 |
| c-1) crosslinker | trimethylsiloxy-terminated polymethylhydrogensiloxane with DP of 221 and % SiH of 1.67% |
| d-1) catalyst | platinum complex dissolved in bis-dimethylvinylsiloxy-terminated polydimethylsiloxane, with a vinyl content of 2% and a Pt content of 0.5% |
| e-1) inhibitor | ethynyl cyclohexanol |
| e-2) inhibitor | [(1,1-Dimethyl-2-propynyl)oxy]trimethylsilane |
| f-1) solvent | toluene from SK Chemical, which was used without any pre-treatment |

Reference Example 1

Molecular Distribution

Molecular distribution of starting materials was analyzed by GPC equipped with triple detector array (Refractive Index, Right Angle Light Scattering, and Viscometer). 0.5% of samples were used for GPC analysis. Mw of Polystyrene standards were in the range of 580 to 100,000, and a $3^{rd}$ order calibration curve was used for molecular weight determination. Both samples and standards were diluted in HPLC grade ethyl acetate.

Reference Example 2

Calculation Method of M/Q Ratio and OH wt %

M/Q ratio and OH % (silanol content) were calculated by using $^{29}$Si NMR results. No dimer of formula was observed in the samples, and broad main M unit of formula $(Me_3SiO_{1/2})$ at 15~8 ppm, M in $M_4Q$, neopentamer, at 8.4 ppm. $Q_3$[OH-SiO$_{3/2}$] at −95~−104 ppm, $Q_4$[SiO$_2$] at −104-120 ppm were observed in $^{29}$Si NMR results. Overall M/Q ratio was calculated from the integration value of M unit in resin and neopentamer together. Because $Q_3$ at −95~−104 ppm represent uncapped OH function in resin, so OH wt % was calculated total OH weight divided by total resin weight.

Reference Example 3

General Procedure for Preparing Pressure Sensitive Adhesive Composition Samples Group 1 samples were prepared by mixing 30 parts of a bis-vinyl terminated dimethylpolysiloxane, or mixture of bis-vinyl terminated polydimethylsiloxane and bis-vinyl terminated poly(dimethylsiloxane/methylvinylsiloxane) and f-1) toluene to make a 30% solution. To each solution were added an MQ resin, c-1) crosslinker, and an inhibitor. After homogenizing this mixture, 0.5 parts of d-1) catalyst (sufficient to provide 25 ppm Pt in the composition) was added. The amounts of each starting material were sufficient to provide a SiH/Vinyl molar ratio of the composition=10. Table 2 shows amounts of each starting material in different Examples.

TABLE 2

| Starting Material | a-1) | a-2) | a-3) | b-1) | b-2) | b-3) | c-1) | e-1) | e-2) | d-1) | f-1) |
|---|---|---|---|---|---|---|---|---|---|---|---|
| EX. 1 | 30 | | | 3 | | | 0.29 | 0.15 | | 0.5 | 70 |
| EX. 2 | | 30 | | 3 | | | 0.63 | 0.15 | | 0.5 | 70 |
| EX. 3 | | | 30 | 3 | | | 1.7 | 0.15 | | 0.5 | 70 |
| EX. 4 | 15 | 15 | | 3 | | | 0.46 | 0.15 | | 0.5 | 70 |
| EX. 5 | | 15 | 15 | 3 | | | 1.15 | 0.15 | | 0.5 | 70 |
| EX. 6 | 30 | | | | 3 | | 0.29 | 0.15 | | 0.5 | 70 |
| EX. 7 | | 30 | | | 3 | | 0.63 | 0.15 | | 0.5 | 70 |
| EX. 8 | | | 30 | | 3 | | 1.7 | 0.15 | | 0.5 | 70 |
| EX. 9 | 15 | 15 | | | 3 | | 0.46 | 0.15 | | 0.5 | 70 |
| EX. 10 | | 15 | 15 | | 3 | | 1.15 | 0.15 | | 0.5 | 70 |
| EX. 11 | 30 | | | | | 3 | 0.29 | 0.15 | | 0.5 | 70 |
| EX. 12 | | 30 | | | | 3 | 0.63 | 0.15 | | 0.5 | 70 |
| EX. 13 | | | 30 | | | 3 | 1.7 | 0.15 | | 0.5 | 70 |
| EX. 14 | 15 | 15 | | | | 3 | 0.46 | 0.15 | | 0.5 | 70 |
| EX. 15 | | 15 | 15 | | | 3 | 1.15 | 0.15 | | 0.5 | 70 |
| EX. 16 | 30 | | | 3 | | | 0.29 | 0.07 | 0.07 | 0.5 | 70 |
| EX. 17 | | 30 | | 3 | | | 0.63 | 0.07 | 0.07 | 0.5 | 70 |
| EX. 18 | | | 30 | 3 | | | 1.7 | 0.07 | 0.07 | 0.5 | 70 |
| EX. 19 | 15 | 15 | | 3 | | | 0.46 | 0.07 | 0.07 | 0.5 | 70 |
| EX. 20 | | 15 | 15 | 3 | | | 1.15 | 0.07 | 0.07 | 0.5 | 70 |

Pressure sensitive adhesive samples prepared as described above were coated on substrates, cured, and evaluated according to the test methods below.

Reference Example 4

Tape Preparation (Coating and Cure)

The pressure sensitive adhesive compositions prepared in Example 1 to Example 20 were applied onto a 75 um urethane primed PET film and cured. The resulting pressure sensitive adhesive was a 10 um thick layer. A pressure sensitive adhesive sheet was produced by heating the coated film for 3.5 min. at 150° C. After curing, the film was laminated with 25 um PET release film and cut into 2.54 mm wide strips. The 75 um urethane primed PET was commercially available as SKC SH-86. The 25 um PET film was commercially available as KOLON CD-901.

Reference Example 5

Release Force Measurement

The pressure sensitive adhesive layer showed adhesion strength to the release film measured according to a 180° peel test specified in ASTM D1000, effective date 2018. The tape prepared in Tape preparation was roll-pressed by 2 kg weight rubber roller and stored at RT for 30 min before measurement. Release force was measured by tensile tester (Test equipment; AR-1000 (Cheminstrument Company)). The adhesion force was measured by pulling the release film off from the pressure-sensitive adhesive tape at an angle of 180° relative to the surface of the adherend with the use of a tensile tester at a constant speed of 12 inch/min.

Reference Example 6

Adhesion Force Measurement on Urethane Film

The tape prepared in Tape preparation described above was peeled from the release films and adhered under pressure of 2 kgf developed by rubber rollers to an adherend in the form of urethane foam-PET laminated film (NANO-CELL™ PSR series obtained from S&K Polytech, Korea). After 30 min., the adherend was released from PET and located on tensile tester (Test equipment; AR-1000 (Cheminstrument Company)). The adhesion force was measured by pulling the pressure sensitive adhesive tape off from the adherend at an angle of 180° relative to the surface of the adherend with the use of a tensile tester at a constant speed of 12 inch/min.

Reference Example 7

Anchorage Test After Storage Under 85° C./85% RH Condition

An adhesive layer prepared as described above as stored under 85° C./85% RH condition for 1 week. After storage, the film was stored at RT for 30 min and 5 cross-cuts were made on the PSA. Rubbing the surface with a finger with utmost strength should result in the PSA should not be rubbed off.
Evaluation Criterion:
Good (O): PSA was not rubbed off from PET
Poor (X): PSA was not rubbed off easily from PET Reference Example 8

Adhesion Stability

Release force was measured after 1 day, 3 days, and 1 week, consecutively with freshly prepared tape described in Tape preparation above. Comparing the release force data and evaluate the difference (increase)
Good (O): 1 week data did not increase more than 50% from 1 day data
Poor (X): 1 week data increased more than 50% from 1 day data Reference Example 9

Visual Migration Test on Urethane Surface

The tape prepared in Tape preparation was peeled from the release films and adhered under pressure of 2 kgf developed by rubber rollers to an adherend in the form of urethane foam-PET laminated film (obtained from S&K Polytech, Korea). After 1 week, PSA tape was released off and urethane surface was carefully observed. Urethane foam surface is originally matte and if the surface showed wetting or any color change, silicone was migrated onto the urethane foam.
Evaluation Criterion:
Good (O): Urethane surface looks matte like before test
Poor (X): Urethane surface looks greasy due to silicone migration

TABLE 3

| Sample | Resin/Gum ratio | Adhesion on PET (gf/inch) | Adhesion on Urethane (gf/inch) | Anchorage Test | Adhesion Stability | Visual Migration |
|---|---|---|---|---|---|---|
| EX. 1 | 0.1 | 5 | 32 | O | X | O |
| EX. 2 | 0.1 | 4 | 22 | X | X | O |
| EX. 3 | 0.1 | 2 | 18 | X | X | O |
| EX. 4 | 0.1 | 5 | 28 | O | X | O |
| EX. 5 | 0.1 | 4 | 16 | X | X | O |
| EX. 6 | 0.1 | 7 | 6 | O | O | O |
| EX. 7 | 0.1 | 6 | 6 | O | O | O |
| EX. 8 | 0.1 | 5 | 4 | O | O | O |
| EX. 9 | 0.1 | 7 | 8 | O | O | O |
| EX. 10 | 0.1 | 6 | 6 | O | O | O |
| EX. 11 | 0.1 | 5 | 29 | X | X | X |
| EX. 12 | 0.1 | 3 | 21 | X | X | X |
| EX. 13 | 0.1 | 4 | 17 | X | X | X |
| EX. 14 | 0.1 | 5 | 26 | X | X | X |
| EX. 15 | 0.1 | 3 | 20 | X | X | X |
| EX. 16 | 0.1 | 4 | 31 | O | O | O |
| EX. 17 | 0.1 | 3 | 24 | X | O | O |
| EX. 18 | 0.1 | 5 | 16 | X | O | O |

TABLE 3-continued

Results

| Sample | Resin/Gum ratio | Adhesion on PET (gf/inch) | Adhesion on Urethane (gf/inch) | Anchorage Test | Adhesion Stability | Visual Migration |
|---|---|---|---|---|---|---|
| EX. 19 | 0.1 | 5 | 26 | ○ | ○ | ○ |
| EX. 20 | 0.1 | 3 | 20 | X | ○ | ○ |

Examples 2, 3, 5-15, 17, 18, and 20 are comparative. Examples 1, 4, 16, and 19 are practical examples. Table 3 shows that Examples 1, 4, 16, and 19 all have a beneficial combination of properties, i.e., all of Examples 1, 4, 16 and 19 all have an unexpected benefit in a combination of good properties: i.e., adhesion of 5 gf/inch on PET, adhesion of 25 gf/inch on urethane foam, good anchorage, and low visual migration. In addition, Examples 16 and 19 show the additional unexpected benefit of good adhesion stability when a silylated acetylenic compound is included in the pressure sensitive adhesive composition.

Comparative Examples 3, 5, 8, 10, 13, 15, 18, and 20 each had high vinyl content (>0.1%) on the vinyl-functional polymethylsiloxane for starting material (A). These Comparative Examples showed that the pressure sensitive adhesive prepared and tested under the conditions described above tended to have poor adhesion on urethane when the vinyl content was high and the other starting materials in the pressure sensitive adhesive composition were kept the same. For example, Comparative Examples 3 and 5 had lower adhesion on urethane foam than Examples 1 and 4 and Comparative Example 2. And, Comparative Example 18 and 20 had lower adhesion on urethane foam than Examples 16 and 19 and comparative example 17. Furthermore, when the pressure sensitive adhesive composition included a bis-dimethylvinyl-siloxy terminated poly(dimethylsiloxane/methylvinylsiloxane) without a dimethylvinyl-siloxy terminated polydimethylsiloxane (i.e., all of starting material a) had pendant vinyl groups, adhesion to urethane foam did not pass, even with a relatively low vinyl content (of 9.06%), as shown in Comparative Examples 2, 7, 12, and 17.

Comparative Examples 11-15 showed that when the Mw of the polyorganosilicate resin was 6,000 (lower than the 8,000 to 25,0000 described above), the pressure sensitive adhesive prepared and tested under the conditions described above had poor migration, poor anchorage, or both.

Comparative Examples 6-10 showed when a capped polyorganosilicate resin having a low silanol content of 1% (i.e. lower than the range of >1% to 5%) and a high M/Q ratio of 1 (i.e., >0.9) was used, the pressure sensitive adhesive prepared and tested under the conditions described above had poor adhesion on urethane foam.

INDUSTRIAL APPLICABILITY

The pressure sensitive adhesive composition described herein can be used to prepare a pressure sensitive adhesive with selective adhesion to different substrates. The pressure sensitive adhesive is useful in a carrier film and has enough adhesion on a urethane foam substrate to support and be well delaminated after use. The adhesion on urethane foam substrate may be 25 gf/inch as measured by the technique described in the Reference Examples. The adhesion on plastic films such as PET may be 10 gf/inch, alternatively 5 gf/inch. Without wishing to be bound by theory, it is thought that such a selective adhesion on different substrate is not common for known silicone pressure sensitive adhesives, such silicone pressure sensitive adhesives would be expected to have almost the same adhesion force on PET and urethane foam substrates.

Definitions and Usage of Terms

All amounts, ratios, and percentages are by weight unless otherwise indicated. The amounts of all starting materials in a composition total 100% by weight. The SUMMARY and the ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 8,000 to 25,000 includes not only the range of 8,000 to 25,000, but also 8,000; 11,005; 12,013; 13,442; 14,596; and 25,000 individually, as well as any other number subsumed in the range. Furthermore, disclosure of a range of, for example, 8,000 to 25,000 includes the subsets of, for example, 8,000 to 10,000; 9,000 to 12,000, 11,000 to 16,000, and 15,000 to 25,000, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a branched, cyclic, or linear, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, cyclopentyl, and/or tert-pentyl); and hexyl, heptyl, octyl, nonyl, and decyl, as well as branched or cyclic saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means an acyclic branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means an acyclic branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

The term "comprise" and derivatives thereof e.g., compris(ing) or comprise(s), are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

Abbreviations have the meanings set forth in Table 4.

TABLE 4

| Abbreviation | Definition |
| --- | --- |
| cSt | centiStokes |
| Da | Daltons, g/mol |
| g | gram |
| GPC | gel permeation chromatography |
| HPLC | high performance liquid chromatography |
| kg | kilogram |
| LCD | liquid crystal display |
| M | monofunctional siloxane unit, e.g., of formula $R^3_3SiO_{1/2}$ in starting material (B) |
| Me | methyl |
| min | minute |
| Mn | number average molecular weight |
| mol | mole |
| Mw | weight average molecular weight |
| NMR | nuclear magnetic resonance |
| OLED | organic light emitting diode |
| PET | polyethylene terephthalate |
| PSA | pressure sensitive adhesive |
| Q | a tetrafunctional siloxane unit of formula (SiO$_{4/2}$) |
| RH | relative humidity |
| RT | room temperature of 25° C. to 30° C. |
| um | micrometer |
| Vi | vinyl |

Embodiments of the Invention

In a first embodiment, a method for fabricating a carrier tape comprises:
1) providing a urethane foam substrate having a device facing surface and an opposing surface opposite the device facing surface,
2) interposing, between a surface of a plastic film and the opposing surface of the urethane foam substrate, a pressure sensitive adhesive composition comprising
   (A) 100 to 70 parts by weight of a bis-alkenyl-terminated polydiorganosiloxane comprising
   A-1) 50% to 100%, alternatively 50% to 99%, based on weight of starting material (A), a first bis-alkenyl-terminated polydiorganosiloxane of unit formula $(R^1R^2_2SiO_{1/2})_a(R^2_2SiO_{2/2})_b$, where each $R^1$ is an independently selected alkenyl group of 2 to 6 carbon atoms, each $R^2$ is an independently selected monovalent hydrocarbyl group free of aliphatic unsaturation, subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and a total alkenyl content greater than 0 to less than 0.1%, based on the weight of the bis-alkenyl-terminated polydiorganosiloxane; and
   A-2) 0 to 50%, alternatively 1% to 50%, based on weight of starting material (A), of a second a bis-alkenyl-terminated polydiorganosiloxane of unit formula:

$(R^1R^2_2SiO_{1/2})_a(R^2_2SiO_{2/2})_b(R^1R^2SiO_{2/2})_c$, where subscript c is 1 or more, and a quantity (a+b+c) has a value sufficient to provide starting material (A-2) with a weight average molecular weight of 100,000 to 1,000,000;
   (B) 1 to 30 parts by weight of a polyorganosilicate resin comprising unit formula $(R^3_3SiO_{1/2})_e(SiO_{4/2})_f$, where each $R^3$ is an independently selected monovalent hydrocarbyl group having 1 to 10 carbon atoms, and subscripts e and f have values such that a molar ratio (e/f)<0.9 and a quantity (e+f) has a value sufficient to give the resin a weight average molecular weight of 8,000 Da to 25,000 Da;
   (C) 0.01 to 5 parts by weight of a polyorganohydrogensiloxane comprising unit formula $(HR^4_2SiO_{1/2})_g(R^4_3SiO_{1/2})_h(R^4_2SiO_{2/2})_i(HR^4SiO_{2/2})_j$, where each $R^4$ is an independently selected alkyl group of 1 to 10 carbon atoms, and subscripts g, h, i, and j have values such that g≥0, h≥0, a quantity (g+h) has an average value of 2, i≥0, j>0, and a quantity (g+j)>0 and the quantity (g+j) has a value sufficient to provide the polyorganohydrogensiloxane with at least 1% silicon bonded hydrogen atoms;
   (D) a hydrosilylation reaction catalyst in an amount sufficient to provide 10 to 5,000 ppm of a platinum group metal to the composition;
   (E) >0.05 to 5.0 parts by weight, alternatively 0.1 to 5.0 parts by weight, per 100 parts by weight based on combined weights of all starting materials in the composition, of a hydrosilylation reaction inhibitor; and
   (F) 10% to 90% by weight of an organic solvent, based on combined weights of all starting materials in the composition;
where all of the starting materials are selected such that overall SiH/Vi molar ratio is 0.7 to 20 in the composition; and 3) curing the composition to form a pressure sensitive adhesive, thereby forming a carrier tape on the opposing surface of the urethane foam substrate.

In a second embodiment, step 2) in the method of the first embodiment is performed by coating the pressure sensitive adhesive composition on the surface of the plastic film, and thereafter removing solvent.

In a third embodiment, in the method of the second embodiment, the opposing surface of the urethane foam substrate is contacted with the pressure sensitive adhesive composition after step 2) or with the pressure sensitive adhesive after step 3).

In a fourth embodiment, step 2) in the method of the first embodiment is performed by coating the pressure sensitive adhesive composition on the opposing surface of the urethane foam substrate and thereafter removing solvent.

in the method of the second embodiment, the opposing surface of the urethane foam substrate is contacted with the pressure sensitive adhesive composition after step 2) or with the pressure sensitive adhesive after step 3). In a fifth embodiment, in the method of the fourth embodiment, the surface of the plastic film is contacted with the pressure sensitive adhesive composition after step 2) or with the pressure sensitive adhesive after step 3).

In a sixth embodiment, a method for fabricating a display device comprises, after steps 1) to 3) of any one of the first through fifth embodiments: 4) adhering the device facing surface of the urethane foam substrate to a backside of a display device.

In a seventh embodiment, the method of the sixth embodiment further comprises: 5) removing the carrier tape from the opposing surface of the urethane foam substrate.

In an eighth embodiment, in the method of the sixth or seventh embodiments, in step 1), the device facing surface of the urethane foam is mounted to a second plastic film, and the second plastic film is removed before step 4).

In a ninth embodiment, in the method of any one of the sixth through eighth embodiments, the device facing surface of the urethane foam substrate is adhered to the backside of the display device through a double sided tape interposed between the backside of the display device and the device facing surface of the urethane foam substrate.

In a tenth embodiment, in the method of any one of the preceding embodiments: each $R^1$ is vinyl, allyl, or hexenyl; each $R^2$ is methyl or phenyl, each $R^3$ is methyl, and each $R^4$ is methyl or phenyl.

In an eleventh embodiment, in the method of any one of the preceding embodiments, starting material (A) comprises a bis-dimethylvinylsiloxy terminated polydimethylsiloxane or a combination of the bis-dimethylvinylsiloxy terminated polydimethylsiloxane and a bis-dimethylvinylsiloxy terminated poly(dimethylsiloxane/methylvinylsiloxane).

In a twelfth embodiment, in the method of any one of preceding embodiments, starting material (B) has a weight average molecular weight of 11,000 to 25,000, a silanol content of >1% to 5%, and 0.5≤(e/f)<0.9.

In a thirteenth embodiment, in the method of any one of the preceding embodiments, subscript g=0, subscript h=2, subscript i=0, and starting material (C) has unit formula:

where subscript j is 30 to 300.

In a fourteenth embodiment, in the method of any one of the preceding embodiments, starting material (D) comprises a platinum complex dissolved in a bis-dimethylvinylsiloxy-terminated polydimethylsiloxane in an amount sufficient to provide 5,000 ppm of platinum based on the weight of starting material (D).

In a fifteenth embodiment, in the method of any one of the preceding embodiments, starting material (E) comprises E-1) an acetylenic alcohol, E-2) a silylated acetylenic compound, or E-3) both E-1) and E-2).

In a sixteenth embodiment, in the method of the fifteenth embodiment, E-1) comprises ethynyl cyclohexanol.

In a seventeenth embodiment, in the method of the fifteenth embodiment, E-2) comprises [(1,1-dimethyl-2-propynyl)oxy]trimethylsilane.

In an eighteenth embodiment, in the method of any one of the fifteenth to seventeenth embodiments, starting material (E) is E-3) both E-1) and E-2).

In a nineteenth embodiment, in the method of any one of the preceding embodiments, starting material (F) comprises toluene.

In a twentieth embodiment, a display device is prepared according to the method of any one of the sixth to nineteenth embodiments.

In a twenty-first embodiment, in the twentieth embodiment the display device is an OLED.

In a twenty-second embodiment, in the twentieth embodiment the display device is an LCD.

The invention claimed is:
1. A pressure sensitive adhesive composition comprising:
(A) 100 to 70 parts by weight of a bis-alkenyl-terminated polydiorganosiloxane comprising unit formula where each $R^1$ is an independently selected alkenyl group of 2 to 6 carbon atoms, each $R^2$ is an independently selected monovalent hydrocarbyl group free of aliphatic unsaturation, subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and a total alkenyl content greater than 0 to less than 0.1%, based on the weight of the bis-alkenyl-terminated polydiorganosiloxane;
(B) 1 to 30 parts by weight of a polyorganosilicate resin comprising units of formulae where each $R^3$ is an independently selected monovalent hydrocarbyl group having 1 to 10 carbon atoms, subscripts e and f have values such that a molar ratio (e/f)<0.9 and a quantity (e+f) has a value sufficient to give the resin a weight average molecular weight of 8,000 to 25,000, and starting material (B) further comprises a silanol content >1 based on weight of the polyorganosilicate resin;
(C) 0.01 to 5 parts by weight of a polyorganohydrogensiloxane comprising unit formula where each $R^4$ is an independently selected alkyl group of 1 to 10 carbon atoms, and subscripts g, h, i, and j have values such that g≥0, h≥0, a quantity (g+h) has an average value of 2, i≥0, j>0, and a quantity (g+j)>0 and the quantity (g+j) has a value sufficient to provide the polyorganohydrogensiloxane with at least 1% silicon bonded hydrogen atoms;
(D) a hydrosilylation reaction catalyst in an amount sufficient to provide 10 to 5,000 ppm of a platinum group metal to the composition;

(E) >0.05 to 5.0 parts by weight, per 100 parts by weight based on combined weights of all starting materials in the composition, of a hydrosilylation reaction inhibitor; and (F) 10% to 90% by weight of an organic solvent, based on combined weights of all starting materials in the composition;

where all of the starting materials are selected such that silicon bonded hydrogen content to aliphatically unsaturated group content molar ratio is 0.7 to 20 in the composition.

2. The composition of claim 1, where starting material (A) comprises 50 to 99% of starting material A-1) and 1% to 50% of starting material A-2) where starting material A-2) has unit formula:

$(R^1R^2_2SiO_{1/2})_a(R^2_2SiO_{2/2})_b(R^1R^2SiO_{2/2})_c$, where subscript c is 1 or more, and a quantity (a+b+c) has a value sufficient to provide starting material A-2) with a weight average molecular weight of 100,000 to 1,000,000.

3. The composition of claim 1, where each $R^1$ is vinyl, allyl, or hexenyl; each $R^2$ is methyl or phenyl, each $R^3$ is methyl, and each $R^4$ is methyl or phenyl.

4. The composition of claim 1, where starting material (A) comprises A-1-1) a bis-dimethylvinylsiloxy terminated polydimethylsiloxane or a combination of A-1-1) the bis-dimethylvinylsiloxy terminated polydimethylsiloxane and A-2-1) a bis-dimethylvinylsiloxy terminated poly(dimethylsiloxane/methylvinylsiloxane).

5. The composition of claim 1, where starting material (B) has a weight average molecular weight of 11,000 to 25,000, a silanol content of >1% to 5%, and 0.5≤(e/f)<0.9.

6. The composition of claim 1, where subscript g=0, subscript h=2, subscript i=0, and starting material (C) has unit formula C-2):

$(R^4_3SiO_{1/2})_2(HR^4SiO_{2/2})_j$, where subscript j is 30 to 300.

7. The composition claim 1, where starting material (D) comprises a platinum complex dissolved in a bis-dimethylvinylsiloxy-terminated polydimethylsiloxane in an amount sufficient to provide 5,000 ppm of platinum based on the weight of starting material (D).

8. The composition of claim 1, where starting material (E) comprises E-1) an acetylenic alcohol, E-2) a silylated acetylenic compound, or E-3) both E-1) and E-2).

9. The composition of claim 8, where E-1) comprises ethynyl cyclohexanol.

10. The composition of claim 8, where E-2) comprises [(1,1-dimethyl-2-propynyl)oxy]trimethylsilane.

11. The composition of claim 8, where starting material (E) is E-3) both E-1) and E-2).

12. The composition of claim 1, where starting material (F) comprises toluene.

13. A method comprising:
1) providing a urethane foam substrate having a device facing surface and an opposing surface opposite the device facing surface;
2) interposing a pressure sensitive adhesive composition between a surface of a plastic film and the opposing surface of the urethane foam substrate, where the composition comprises:
(A) 100 to 70 parts by weight of a bis-alkenyl-terminated polydiorganosiloxane comprising unit formula $(R^1R^2_2SiO_{1/2})_a(R^2_2SiO_{2/2})_b$, where each $R^1$ is an independently selected alkenyl group of 2 to 6 carbon atoms, each $R^2$ is an independently selected monovalent hydrocarbyl group free of aliphatic unsaturation, subscript a has an average value of 2, subscript b is 1 or more, and a quantity (a+b) has a value sufficient to provide the bis-alkenyl-terminated polydiorganosiloxane with a weight average molecular weight of 100,000 to 1,000,000 and a total alkenyl content greater than 0 to less than 0.1%, based on the weight of the bis-alkenyl-terminated polydiorganosiloxane;

(B) 1 to 30 parts by weight of a polyorganosilicate resin comprising units of formulae $(R^3_3SiO_{1/2})_e(SiO_{4/2})_f$, where each $R^3$ is an independently selected monovalent hydrocarbyl group having 1 to 10 carbon atoms, subscripts e and f have values such that a molar ratio (e/f)<0.9 and a quantity (e+f) has a value sufficient to give the resin a weight average molecular weight of 8,000 to 25,000, and starting material (B) further comprises a silanol content >1 based on weight of the polyorganosilicate resin;

(C) 0.01 to 5 parts by weight of a polyorganohydrogensiloxane comprising unit formula $(HR^4_2SiO_{1/2})_g(R^4_3SiO_{1/2})_h(R^4_2SiO_{2/2})_i(HR^4SiO_{2/2})_j$, where each $R^4$ is an independently selected alkyl group of 1 to 10 carbon atoms, and subscripts g, h, i, and j have values such that g≥0, h≥0, a quantity (g+h) has an average value of 2, i≥0, j>0, and a quantity (g+j) >0 and the quantity (g+j) has a value sufficient to provide the polyorganohydrogensiloxane with at least 1 silicon bonded hydrogen atoms;

(D) a hydrosilylation reaction catalyst in an amount sufficient to provide 10 to 5,000 ppm of a platinum group metal to the composition;

(E) >0.05 to 5.0 parts by weight, per 100 parts by weight based on combined weights of all starting materials in the composition, of a hydrosilylation reaction inhibitor; and (F) 10% to 90% by weight of an organic solvent, based on combined weights of all starting materials in the composition;

where all of the starting materials are selected such that silicon bonded hydrogen content to aliphatically unsaturated group content molar ratio is 0.7 to 20 in the composition;

3) curing the composition to form a pressure sensitive adhesive, thereby forming a carrier tape on the opposing surface of the urethane foam substrate;

optionally 4) adhering the device facing surface of the urethane foam substrate to a backside of a display device; and optionally 5) removing the carrier tape from the opposing surface of the urethane foam substrate.

14. The method of claim 13, where starting material (A) comprises 50 to 99% of starting material A-1) and 1% to 50% of starting material A-2) where starting material A-2) has unit formula:

$(R^1R^2_2SiO_{1/2})_a(R^2_2SiO_{2/2})_b(R^1R^2SiO_{2/2})_c$, where subscript c is 1 or more, and a quantity (a+b+c) has a value sufficient to provide starting material A-2) with a weight average molecular weight of 100,000 to 1,000,000.

15. The method of claim 13, where starting material (B) has a weight average molecular weight of 11,000 to 25,000, a silanol content of >1% to 5%, and 0.5≤(e/f)<0.9.

16. The method of claim 13, where subscript g=0, subscript h=2, subscript i=0, and starting material (C) has unit formula C-2):

$(R^4_3SiO_{1/2})_2(HR^4SiO_{2/2})_j$, where subscript j is 30 to 300.

17. The method of claim 13, where starting material (D) comprises a platinum complex dissolved in a bis-dimethylvinylsiloxy-terminated polydimethylsiloxane in an amount sufficient to provide 5,000 ppm of platinum based on the weight of starting material (D).

18. The method of claim 13, where starting material (E) comprises E-1) an acetylenic alcohol, E-2) a silylated acetylenic compound, or E-3) both E-1) and E-2).

19. The method of claim 13, where starting material (F) comprises toluene.

* * * * *